US012739293B2

(12) United States Patent
Niemiec et al.

(10) Patent No.: US 12,739,293 B2
(45) Date of Patent: Sep. 15, 2026

(54) SYSTEM AND METHOD FOR SMART TRANSCRIPTION PROXY SERVICE FOR LIMITING AUDIO PROCESSING

(71) Applicant: MOTOROLA SOLUTIONS, INC., Chicago, IL (US)

(72) Inventors: Pawel Niemiec, Rzeszow (PL); Lukasz Luczak, Skawina (PL); Miroslaw Gwizdz, Mylynne (PL); Michal P Brewinski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/805,877

(22) Filed: Jun. 8, 2022

(65) Prior Publication Data

US 2023/0403315 A1 Dec. 14, 2023

(51) Int. Cl.

*H04L 65/75* (2022.01)
*G10L 15/26* (2006.01)
*H04L 67/06* (2022.01)

(52) U.S. Cl.

CPC .............. *H04L 65/75* (2022.05); *G10L 15/26* (2013.01); *H04L 67/06* (2013.01)

(58) Field of Classification Search

CPC ...... G10L 15/26; G06Q 20/20; G06Q 20/407; H04N 5/278; G06F 16/1748

See application file for complete search history.

(56) References Cited

U.S. PATENT DOCUMENTS 11,295,743 B1 * 4/2022 Bumberger ............. G10L 15/22
2010/0228546 A1 * 9/2010 Dingler ................ G09B 21/009 704/235
2011/0051727 A1 3/2011 Cai et al.
2014/0297811 A1 10/2014 Stevens et al.
2019/0108221 A1 * 4/2019 Nelson .................... G10L 15/26
2019/0197187 A1 * 6/2019 Zhang ..................... G06F 16/71
2019/0342594 A1 * 11/2019 Korte ................. H04N 21/4394
2021/0193148 A1 * 6/2021 Kumar .................... G06F 3/165
2021/0243491 A1 * 8/2021 Kraegeloh ........... H04N 21/485
2022/0180899 A1 * 6/2022 Wu .................... H04N 21/8549
2022/0393898 A1 * 12/2022 Maury ................ H04L 12/1831
2023/0352026 A1 * 11/2023 Springer ............... G10L 15/063

FOREIGN PATENT DOCUMENTS

CA 2643428 A1 9/2007
WO 2010100001 A1 9/2010

* cited by examiner

*Primary Examiner* — John A Follansbee
*Assistant Examiner* — Christopher P Cadorna

(57) ABSTRACT

Techniques for transcription of an audio stream are provided. A request for transcription of a first audio stream from a first device is received. A request for transcription of a second audio stream from a second device is received. It is determined that the first and second audio streams are the same. One of the first and second audio streams are selected for transcription. Transcription of the selected audio stream is requested.

17 Claims, 6 Drawing Sheets

SYSTEM AND METHOD FOR SMART TRANSCRIPTION PROXY SERVICE FOR LIMITING AUDIO PROCESSING

BACKGROUND

The availability, cost, and accuracy of automatic transcription services is continuously improving. An audio stream may be sent to a transcription service and be processed. The response from the transcription service may be a text based transcript of the audio stream. A text based transcript may be easier to store and search using various text based search capabilities.

In the public safety environment (e.g. law enforcement, fire service, emergency medical services, etc.) responders are often equipped with communications devices, such as Land Mobile Radios (LMR). One example of such a system is the Project 25 (P25) based system promulgated by the Association of Public Safety Communications Officials (APCO). This is only one example of a radio communications system and other standards exist as well. In general, public safety communications systems will use a Push-to-Talk (PTT) model in which a responder in the field may wish to communicate using a communications device (e.g. a walkie talkie, car mounted radio, etc.) and will press a PTT button on his device to request a communications channel.

Once the channel is granted, the responder may speak and the communication may be heard by all others on the channel. A dispatcher wishing to communicate with a responder may follow a similar procedure, although the dispatcher will generally communicate via a fixed console position, rather than a mobile communications device. In general, regardless of source (responder or dispatcher), a call may include depressing the PTT button, being granted a communications channel, and then speaking.

Once common feature that some modern communications systems have is that they are packet based, as opposed to circuit based. An advantage of a packet based system is that calls may be sent to multiple sites at the same time, thus allowing for distributed processing of the calls. Each site may include a server to handle the communications with the core network. For example, there may be multiple sites with dispatcher consoles allowing for fault tolerance in case one of the sites becomes unavailable. Furthermore, each site may make use of available transcription services by forwarding the packet stream of a call to a transcription service in order to generate a text based transcript.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Figure 1:
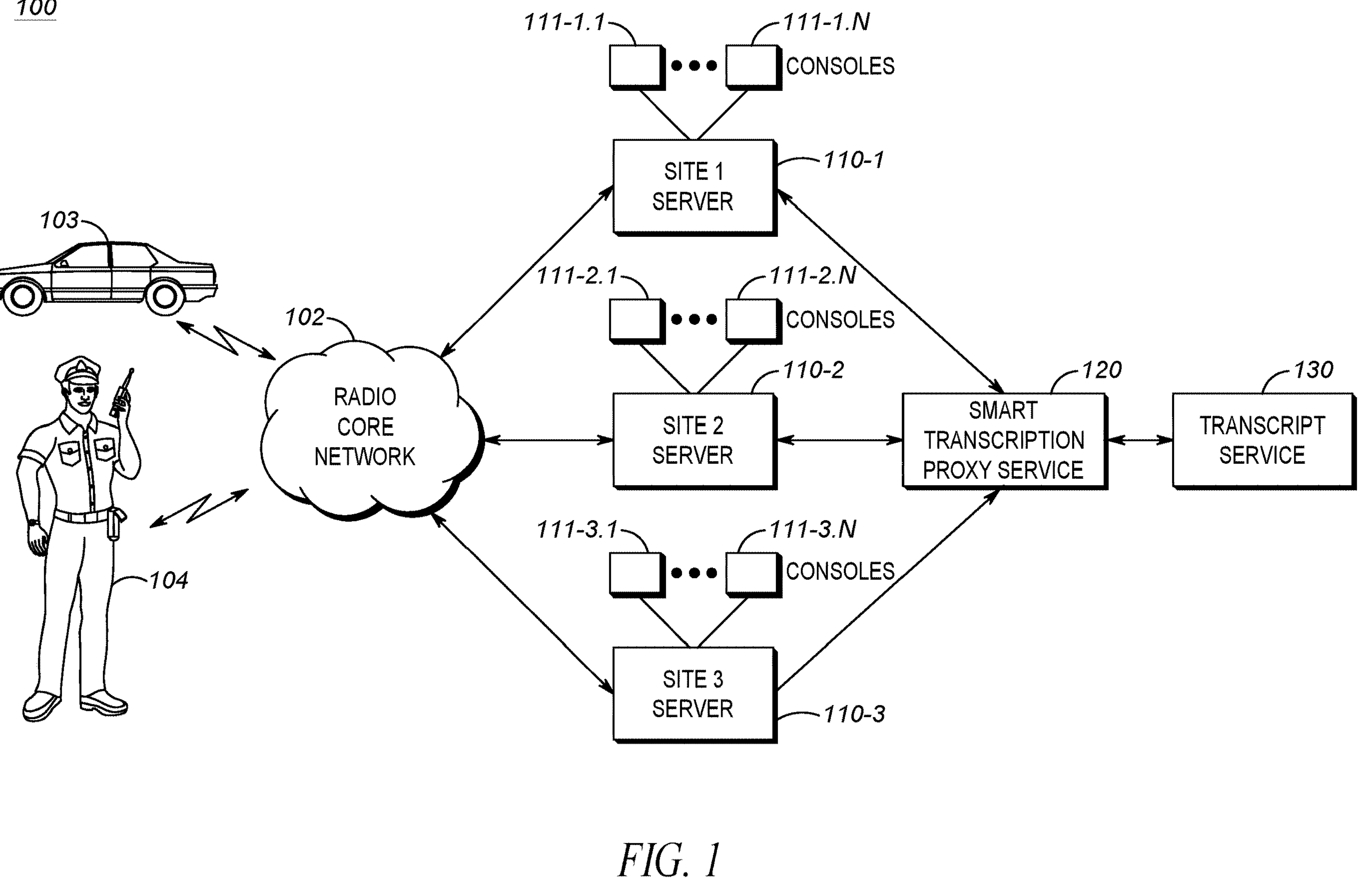
FIG. 1 is a block diagram of an example system that may implement the smart transcription proxy service for limiting audio processing techniques described herein.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

As mentioned above, each call may be sent to multiple sites. For example, a city may have multiple sites where dispatch activities occur, in order to provide redundancy in case one of the sites becomes unavailable (e.g. natural disaster, terrorist attack, etc.). As such, each site may be fully redundant. Each site may include a server that handles communications with the packet network.

Because each site may be fully redundant, each site may independently request transcription of a call. It should be understood that this redundant request process may be necessary because each site is not necessarily aware of other sites that are currently operational and have also requested transcription of a given call. As such, to ensure transcription of a call occurs, each site may need to request transcription.

A problem arises in that duplicate transcription requests for the same call may be sent by the site servers to the transcription service. This may be a problem because in some models, the transcription service may be a fee based service. For example, a fee may be charged for each call that is requested to be transcribed. It should be clear that transcribing duplicate calls would result in additional unnecessary fees being charged for redundant transcription. Even in cases where the transcription is not fee based, transcription of the same call multiple times is wasteful of processing resources that could be better used to accomplish other tasks. In some cases, such as a cloud environment, the user may be charged for processing resources used by a transcription service, thus transcribing the same call multiple times results in extra charges.

The techniques described herein solve these problems and others individually and collectively. A smart transcription proxy service is provided that receives transcription requests from a server at each site. The transcription request includes details of the call, such as a call ID, a source ID, a timestamp, etc. The smart transcription proxy service determines if it has received multiple requests for transcription of the same call. The smart transcription proxy service may select one request for which the call audio stream is actually sent to the transcript service for transcription.

In some cases, the selection process may simply be a random selection. In another example, the selection process may be a round robin selection process to distribute the load of providing the audio stream amongst all available servers. In yet another example, the selection process may determine the network parameters between the site server and the transcript service, and choose the server which has the most favorable parameters. In some cases, the parameters are periodically checked, and if a different server is determined to have more favorable parameters, the audio stream from that server may be selected.

Once the transcription process is complete, the transcript maybe sent from the transcript service to the smart transcription proxy service. The smart transcription proxy service may then distribute the transcript to each server that requested the transcript.

A method for transcription of an audio stream is provided. The method includes receiving a request for transcription of a first audio stream from a first device. The method also includes receiving a request for transcription of a second audio stream from a second device. The method also includes determining that the first and second audio streams are the same. The method also includes selecting one of the first and second audio streams for transcription. The method also includes requesting transcription of the selected audio stream.

In one aspect, the method includes sending the transcription of the selected audio stream to both the first and second device. In one aspect, determining the first and second audio stream are the same further includes determining at least one of a call ID, a source ID, and a timestamp of the first and second audio streams are the same for each audio stream. In one aspect, selecting one of the first and second audio streams further includes requesting network parameters from the first and second device and selecting the audio stream from the device with the most favorable network parameters.

In one aspect of the method, the network parameters include at least one of jitter, packet loss, and latency. In one aspect, the method further includes periodically requesting network parameters from the first and second device and repeating the step of selecting the audio stream from the device with the most favorable network parameters. In one aspect, the method further includes receiving a request for transcription of a third audio stream from a third device, determining that the third audio stream is the same as the first and second audio stream, and selecting at least two of the first, second, and third audio streams for transcription.

A system is provided. The system includes a processor and a memory coupled to the processor. The memory contains a set of instructions thereon that cause the processor to receive a request for transcription of a first audio stream from a first device. The instructions further cause the processor to receive a request for transcription of a second audio stream from a second device. The instructions further cause the processor to determine that the first and second audio streams are the same. The instructions further cause the processor to select one of the first and second audio streams for transcription. The instructions further cause the processor to request transcription of the selected audio stream.

In one aspect, the instructions further cause the processor to send the transcription of the selected audio stream to both the first and second device. In one aspect the instructions to determine the first and second audio stream are the same further comprises instructions to determine at least one of a call ID, a source ID, and a timestamp of the first and second audio streams are the same for each audio stream. In one aspect the instructions to select one of the first and second audio streams further comprises instructions to request network parameters from the first and second device and select the audio stream from the device with the most favorable network parameters.

In one aspect, the network parameters include at least one of jitter, packet loss, and latency. In one aspect, the instructions further cause the processor to periodically request network parameters from the first and second device and repeat execution of the instructions to select the audio stream from the device with the most favorable network parameters. In one aspect, the instructions further cause the processor to receive a request for transcription of a third audio stream from a third device, determine that the third audio stream is the same as the first and second audio stream, and select at least two of the first, second, and third audio streams for transcription.

A non-transitory processor readable medium containing a set of instructions thereon is provided. The instructions on the medium, that when executed by a processor, cause the processor to receive a request for transcription of a first audio stream from a first device. The instructions on the medium further cause the processor to receive a request for transcription of a second audio stream from a second device. The instructions on the medium further cause the processor to determine that the first and second audio streams are the same. The instructions on the medium further cause the processor to select one of the first and second audio streams for transcription. The instructions on the medium further cause the processor to request transcription of the selected audio stream.

In one aspect, the instructions on the medium further cause the processor to send the transcription of the selected audio stream to both the first and second device. In one aspect, the instructions on the medium to determine the first and second audio stream are the same further comprises instructions to determine at least one of a call ID, a source ID, and a timestamp of the first and second audio streams are the same for each audio stream. In one aspect, the instructions on the medium to select one of the first and second audio streams further comprises instructions to request network parameters from the first and second device and select the audio stream from the device with the most favorable network parameters.

In one aspect, the instructions on the medium further cause the processor to periodically request network parameters from the first and second device and repeat execution of the instructions to select the audio stream from the device with the most favorable network parameters. In one aspect, the instructions on the medium further cause the processor to receive a request for transcription of a third audio stream from a third device, determine that the third audio stream is the same as the first and second audio stream, and select at least two of the first, second, and third audio streams for transcription.

Further advantages and features consistent with this disclosure will be set forth in the following detailed description, with reference to the figures.

FIG. 1 is a block diagram of an example system 100 that may implement the smart transcription proxy service for limiting audio processing techniques described herein. System 100 may include a radio core network 102. The radio core network 102 may allow for radio communications between dispatchers and filed public safety personnel. An example of a radio core network may be a Project 25 (P25) network. Other examples may include a Terrestrial Radio (TETRA) network, or a Digital Mobile Radio (DMR) network. The particular type of network is relatively unimportant, so long as it is a packet switched network capable of sending audio streams to multiple destinations at the same time.

The system 100 may also include field communications units. Two example, units are shown. In-vehicle mobile unit 103 may include a radio that is mounted within a vehicle, such as a police car or a fire engine. The in-vehicle communications unit allows for a first responder within the vehicle to communicate with a dispatcher. Another type of communications unit may include a portable communications unit 104 that may be carried by a first responder. Such units are often referred to as walkie-talkies. Although only two communications devices are shown, it should be understood that any number of devices, in any form factor may exit. What should be understood is that the communications devices allow for communication between the device users and dispatchers.

In general, the communications devices are Push-to-Talk (PTT) type devices. When a user wishes to communicate with a dispatcher, a PTT button on the device is pressed. Pressing the PTT button requests a communications channel. The grant of the communications channel is generally indicated by a tone, often referred to as a talk permit tone. Upon receipt of the talk permit tone, the user may begin speaking. Once finished, the user may release the PTT button. The sequence of pressing the PTT button, being granted a communications channel, communicating, and releasing the PTT button may be referred to as a call. A call may have multiple identifiers, such as a Source ID, indicating the unit that is requesting communications. The call may have a call ID that is an identifier for a specific instance of a PTT request. A call identifier may be a number that increases by one for each PTT press, until a maximum is reached (e.g. 64,000) at which point the count returns to zero. The call may also include a timestamp. Other indicators for the call may also be included, such as a resource ID, or a talkgroup ID. What should be understood is that each call is associated with identifiers, which can be referred to as call metadata, that are sufficient to identify an individual call.

The system may also include multiple console sites, each console site having a server. The site server may be connected to the radio core network 102. As shown in FIG. 1, there are three site servers 110-1, 2, 3. Each site server may control communications between the radio core network and the consoles at each site.

Each site may include one or more consoles 111-1.1-*n*, 2.1-*n*, 3.1-*n*. A console may include functionality similar to the communications units 103, 104 in that it allows for PTT communications between the console operator (e.g. a dispatcher) and the field communications units. The console will also generally include additional capabilities for managing the radio core network 102, such as the ability to patch different users together. What should be understood though is that dispatchers may use the consoles 111 to communicate with the field communications units via PTT communications. Just as with the communications from the field units, PTT communications originating from the consoles will also include sufficient information to identify a specific call.

System 100 may also include smart transcription proxy service 120 which may be used to ensure that each call is only transcribed a single time. As explained above, each site server 110 may request transcription of the same call. The smart transcription proxy server 120 ensures that unnecessary duplication of transcription requests do not occur. Operation of the smart transcription proxy service is described in further detail below.

The system 100 may also include transcript service 130. The transcript service may provide the capability to receive an audio stream of a call from a field unit 103, 104 or a console 110, and convert the audio stream into a text based transcript. There are many different types of transcript service available, with different revenue generating models. The techniques described herein are suitable for use with any transcription service revenue model.

In operation, field units 103, 104 will communicate with consoles 111. Each call will be received by every site server. Because each server site operates independently (to ensure availability in case a server site is unavailable) each site server may request a transcript of each call. As should be clear, this may result in multiple requests for transcription of the same call.

The site servers 110 may send transcription requests to the smart transcription proxy service 120. Based on the call identifiers, the smart transcription proxy service 120 can determine which requests are for the same call. The smart transcription proxy service may then select at least one transcription request to forward to the transcript service 130. In some cases, the selection is based on the network parameters between the consoles 111, field units 103, 104, and the transcript service 130.

The selected site server 110 then causes the audio stream associated with the call to be sent to the transcript service 130. The number of requests sent to the transcript service 130 is generally less than the number of requests sent to the smart transcription proxy service. The transcript service 130 then transcribes the audio stream associated with the call, and returns the transcript to each site server that requested transcription of the call.

Figure 2:
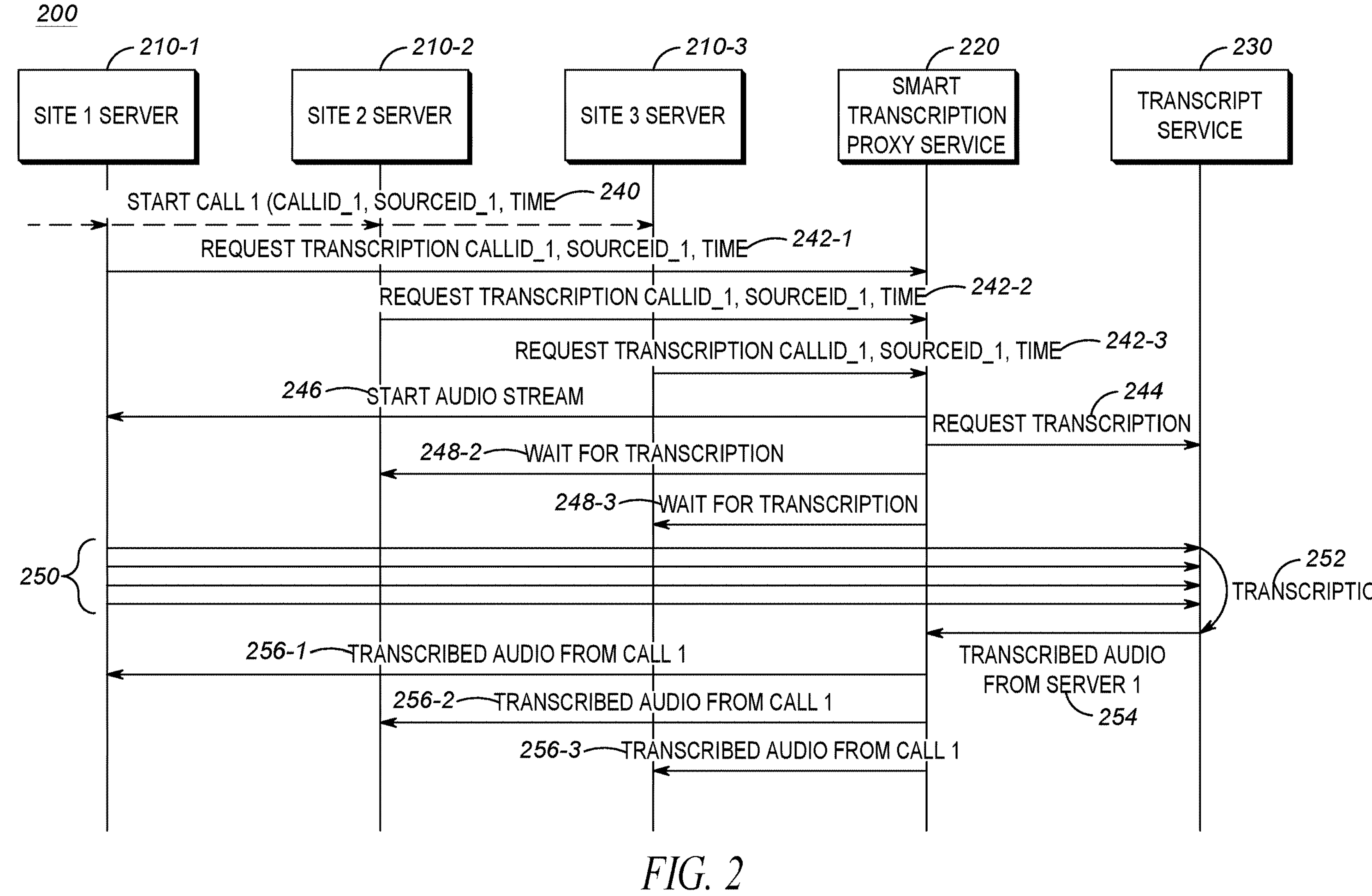
FIG. 2 is an example of a message sequence diagram for the smart transcription proxy service for limiting audio processing techniques described herein.

FIG. 2 is an example of a message sequence diagram for the smart transcription proxy service for limiting audio processing techniques described herein. The system 200 may include Site Server 1 210-1, Site Server 2 210-2, and Site Server 3 210-3. These site servers are generally the equivalent of the servers 110 described with respect to FIG. 1. In other words, these servers are the servers at each communications site that are connected to the core network and will be able to receive communications, such as radio communications from public safety officers. Each site server may also be responsible for requesting transcription of those communications and storing the resultant transcribed text.

System 200 may also include smart transcription proxy service 220. The smart transcription proxy service 220 may receive requests for transcription from the various site servers 210. The smart transcription proxy server 220 may select one or more of the audio streams from the various site servers, and request that the selected audio stream be transcribed. The basis for the selection is described in further detail below.

System 200 may also include transcript service 230 that is capable of receiving an audio stream and transcribing that audio stream into a text based form that may be more suitable for post processing. There are many transcription services currently available, including those that are cloud based. In many cases, the transcription service may be a fee based service, in which a fee is charged for each audio stream that is transcribed. As explained above, in some cases, it would be wasteful to transcribe every audio stream, as the audio streams may be duplicates. Even in cases where the transcription service is not fee based (e.g. per transcript), it is inefficient to transcribe the same audio stream multiple times. It should be understood that the techniques described herein are not dependent on any particular format of transcription service, whether the service be cloud based or on premise, charging per transcript or flat fee, or any other form. Any transcription service that takes in an audio stream and produces a transcript is suitable for use with the techniques described herein.

At step 240, an audio stream, herein referred to as a call, may start. For purposes of the remainder of this description, this audio stream will be referred to as Call 1. The call has certain characteristics, such as a call ID, which in this case is CallID_1. The call ID is an identifier used to identify this particular communication. In the case of a P25 system, the call ID may be assigned when the PTT button on a radio or console is pressed. The call may also include a Source ID, which is shown as Source_ID_1. Every call, e.g. PTT press, is associated with an identifier of the unit (e.g. radio or console) that has pressed the PTT button. The call may also include a timestamp, which identifies when the call has occurred.

Although several examples of call identifiers have been presented, it should be understood that the techniques described herein are not limited to the specific identifiers presented. What should be understood is that for each call, there are a set of associated metadata that can be uniquely be linked to that call. As shown, because all servers 210 are connected to the communications network, they all receive the indication of Call 1 at the same time.

Each server 210 may then request that the call be transcribed. For example, each server 210-1,2,3 may send a request transcription message 242-1,2,3 to the smart transcription proxy service 220. The requests 242 may include the metadata that is used to identify the call. For example, the metadata may include the call ID, the Source ID, and the time. Again, these specific parameters are simply for purposes of ease of description. Any metadata that can be used to identify a call would be suitable for use with the techniques described herein. What should be understood is that the metadata transmitted along with the transcription request allows the smart transcription proxy service to determine that it is receiving multiple transcription requests for the same call.

The smart transcription proxy server 220 may the select one of the requests from the servers 210 to transcribe. By selecting one of the requests, duplicate transcriptions, with their resultant increased costs/processing power waste can be avoided. In a simple implementation, the smart transcription proxy service may simply randomly select a server whose audio stream will be transcribed. In a slightly more sophisticated implementation, the smart transcription proxy server may utilize a round robin selection technique, where each server is selected in sequence. An even more sophisticated selection technique is described below with respect to FIG. 3, in which network quality is taken into account when selecting an audio stream to transcribe.

At step 244, a request transcription message may be sent from the smart transcription proxy server 220 to the transcription service 230 to request that an incoming audio stream be transcribed. As explained above, the techniques described herein are suitable for use with any type of transcription, either currently available or later developed. At the time of the request for transcription 244, a start audio stream 246 instruction may be sent to the selected server to indicate to that server that they should being providing the audio stream to the transcript service 230. In the example shown in FIG. 2, server 210-1 was selected, and receives the start audio stream instruction 246. Site server 1 may then provide the audio steam 250 of Call_ID_1 to the transcript server.

The non-selected servers 210-2,3 may receive a wait for transcription 248-2,3 message in response to their request transcription requests 242-2, 3. This means that those servers will not send the audio stream of CallID_1 to the transcript service 230, but instead will simply wait for the completed transcript to be provided.

The transcript service 230 may receive the audio stream 250 from server 210-1 and being the transcription process 252. Upon completion of the transcription process for the call, the transcribed audio from server 1 may be sent 254 to the smart transcript proxy service 220. The smart transcription proxy service may then send 256-1, 2, 3 the transcribed audio from call 1 to each server that requested it originally. What should be noted is that although transcription of three audio streams was requested, the transcription service only performed the transcription a single time.

Figure 3:
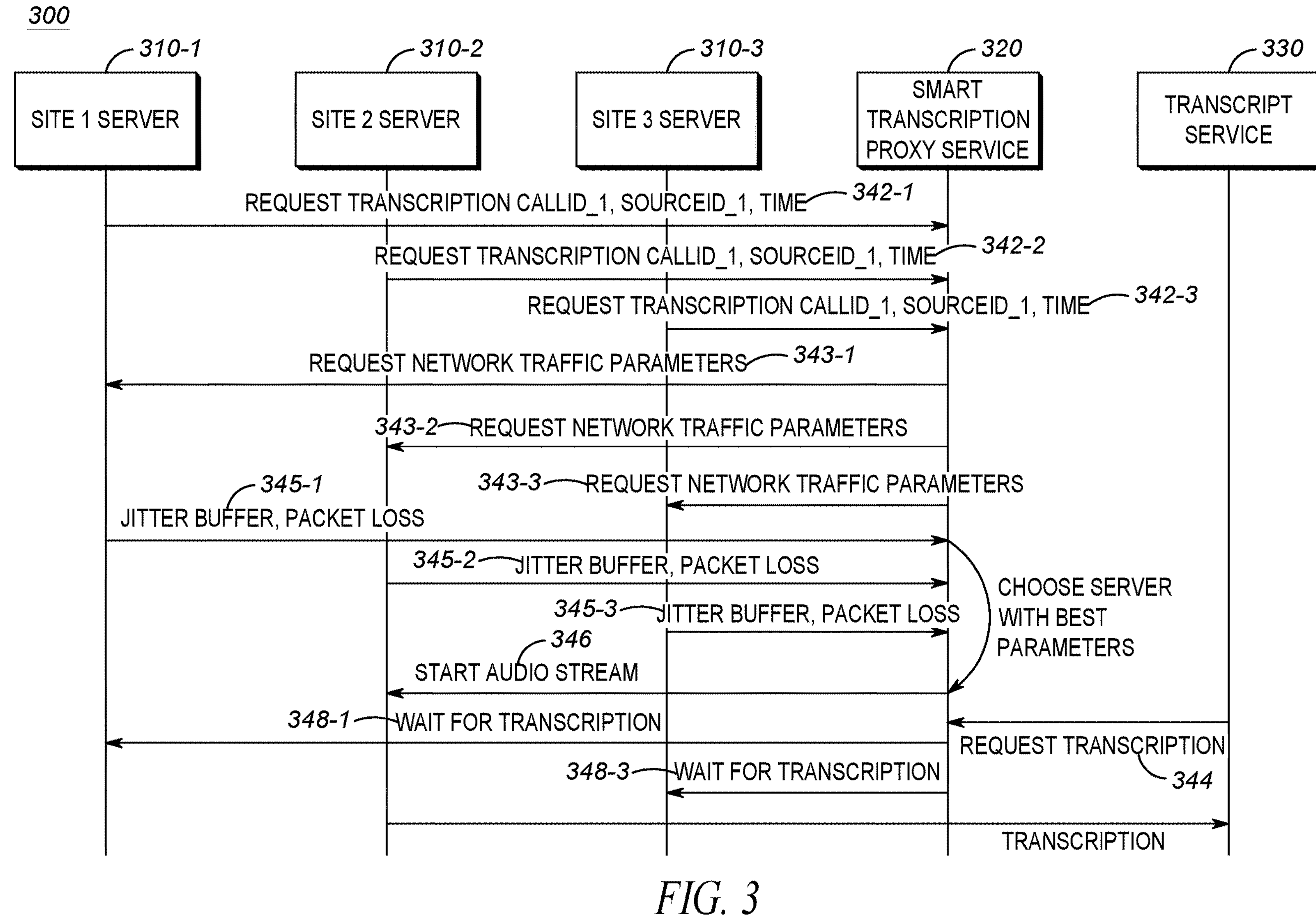
FIG. 3 is an example of a message sequence diagram for the smart transcription proxy service for limiting audio processing techniques using network parameters to select a transcription source according to the techniques described herein.

FIG. 3 is an example of a message sequence diagram for the smart transcription proxy service for limiting audio processing techniques using network parameters to select a transcription source according to the techniques described herein. As mentioned above, the smart transcription proxy service may simply use a random or round robin (or some equally unsophisticated technique) when selecting an audio stream to transcribe. However, such a technique assumes that the quality of each of those audio streams are identical. As shown in FIG. 1, each site server may have a separate network connection to the core communications network. As such, each of those network connections may have different operating parameters.

Some examples of those operating parameters could include packet loss, latency, throughput, jitter, buffer sizes, etc. These parameters, individually and collectively, may impact the quality of the received audio stream. For example, an audio stream sent over a connection with zero packet loss would be of a higher quality than an audio stream sent over a connection with a much higher rate of packet loss. Thus, even though the audio streams may be identical prior to traversing the network, the network parameters could result in one audio stream being of higher quality than another.

The accuracy of audio transcription is highly dependent on the quality of the input audio stream. As such, it would be desirable to select the highest available quality audio stream for transcription, in order to reduce transcription errors caused by low quality audio streams. The techniques described with respect to FIG. 3 allow for selecting the audio stream with the highest quality based on the network parameters.

The message sequence diagram 300 of FIG. 3 is very similar to that of the one presented with respect to FIG. 2. Again, there are site servers 310-1,2,3 which perform essentially the same functions as those described above. There is also transcript service 330, which operates similarly to transcript service 220. Smart transcription proxy service 320 differs from that described in FIG. 2, in that network parameters are taken into account when selecting which audio stream is to be transcribed.

Message sequence 300 begins with the request for transcription 342-1, 2, 3, which, just as above, includes the metadata needed for the smart transcription proxy service 320 to determine that the requests are all for the same call. At this point, the smart transcription proxy service 320 may then send a request for network parameters 343-1, 2, 3 to each of the servers 310-1, 2, 3 to request that those servers provide the network parameters that may have an impact on the quality of the audio stream sent from that server. Some example parameters may include things such as jitter, buffer, packet loss, etc. The specific parameters are relatively unimportant. What should be understood is that the network parameters that could affect audio stream quality are requested.

The servers 310-1, 2, 3 may then respond to the request 343 by sending the requested network parameters 345-1, 2, 3 back to the smart transcription proxy service 320. The smart transcription proxy service may then select the server that has the highest quality network parameters in comparison to the other servers. It may then send a request for transcription 344 to the transcript service.

Just as above, the smart transcription proxy service 320 may then send a start audio stream message 346 to the selected server. In this example, server 310-2 was selected. The site 2 server would then begin streaming audio to the transcript service (not shown). The other two servers, 310-1, 3 would receive a wait for transcription 348-1,3 message which indicates they should not begin streaming audio to the transcript service, but should rather simply wait for the completed transcript to be sent to them (not shown).

Although not shown, it should be understood that the process describe with respect to FIG. 3 could be repeated periodically. Network conditions rarely remain static. The server with the best network parameters at the beginning of the call may not have the best parameters during the call. As such, the steps of querying for network parameters may be repeated during the call or between calls. The network parameter analysis could be repeated and a new server selected. If a new server is selected, the audio stream from the initially selected server could be halted and the audio stream may being from the newly selected server.

Figure 4:
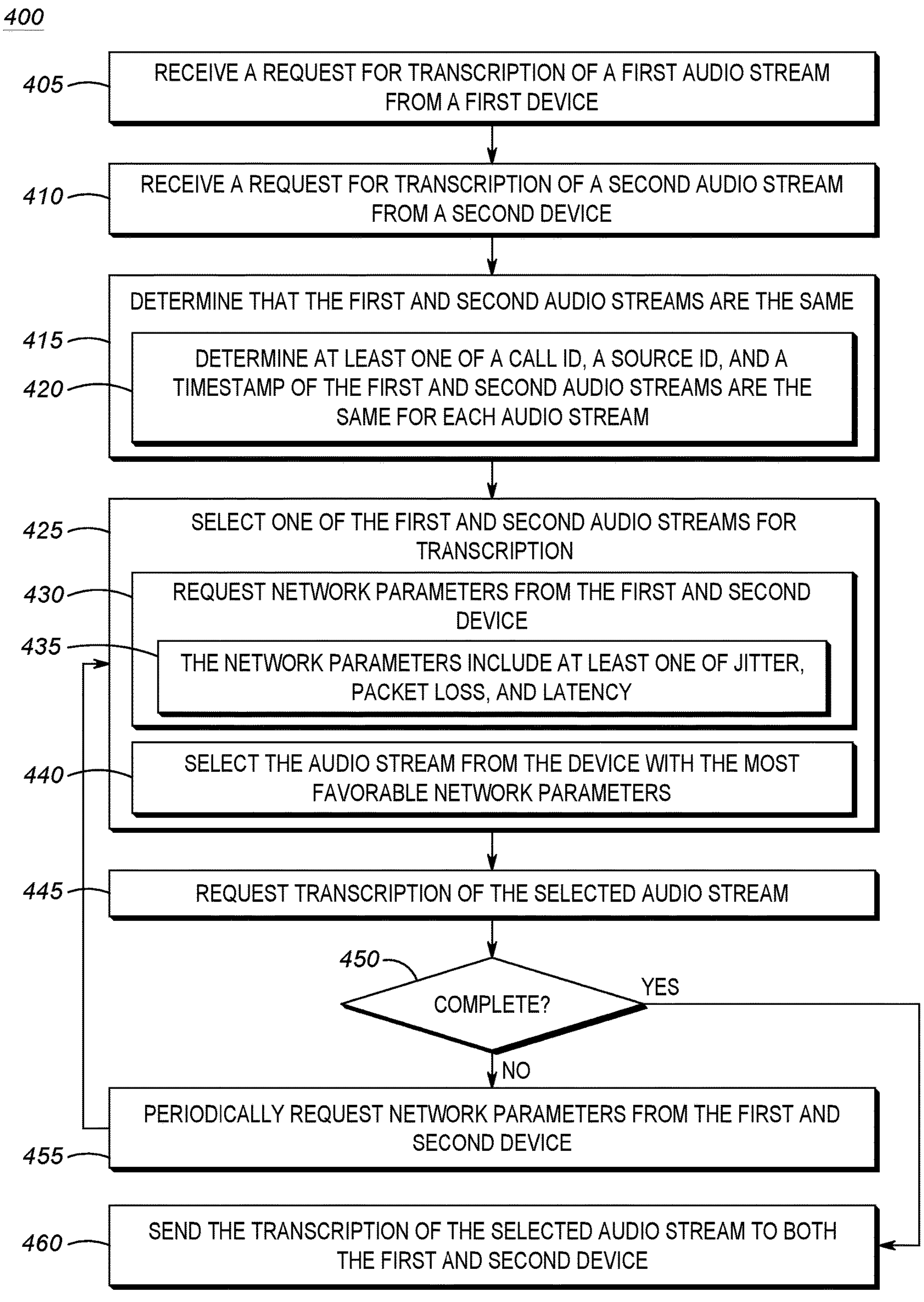
FIG. 4 is an example flow diagram in accordance with the smart transcription proxy service for limiting audio processing techniques described herein.

FIG. 4 is an example flow diagram 400 in accordance with the smart transcription proxy service for limiting audio processing techniques described herein. In block 405, a request for transcription of a first audio stream may be received from a first device. For example, the request to transcribe the audio stream may come from a server, such as server 110-1 described with respect to FIG. 1. The server may be a server at an emergency call handling center, such as a Public Safety Answering Point (PSAP). In block 410, a request for transcription of a second audio stream may be received from a second device. The second device may be a server, such as server 110-2, described with respect to FIG. 2. What should be understood is that at this point, these are two independent requests for two independent audio streams.

In block 415, it may be determined that the first and second audio streams are the same. There are many ways that it can be determined if the two audio streams are the same. For example, each audio stream is associated with a call, and that call has associated metadata. By comparing the metadata, it can be determined if the two audio streams are the same. In block 420, the audio streams are determined to be the same if it can be determined that at least one of a call ID, a source ID, and a timestamp of the first and second audio streams are the same for each audio stream. In other words, if the metadata associated with the audio streams are the same, then the audio streams are the same.

In block 425, one of the first and second audio streams may be selected for transcription. In a simple implementation, the audio stream may be selected at random. In other simple implementations, the audio stream may be selected in a round robin fashion. What should be understood is that a number of audio streams is selected that is less than the total number of audio streams that have been determined to be the same.

In one example, of a more sophisticated audio stream selection, in block 430, network parameters may be requested from the first and second device. The network parameters are the parameters of the network links between the first and second device and the device implementing the techniques described herein (i.e. the smart transcription proxy service). In block 435, the network parameters include at least one of jitter, packet loss, and latency.

In block 440, the audio stream from the device with the most favorable network parameters may be selected. The most favorable network parameters will typically be associated with higher audio quality of the audio stream to be transcribed. As the quality of a transcription is generally dependent on the quality of the input audio stream, it is desirable to select the audio stream with the highest available quality. As that stream is likely to be associated with the most favorable network parameters, use of the network parameters can be used as a proxy for audio quality. All of the available network parameters may be combined to create a network parameter score. The parameters may be weighted such that certain parameters (e.g. lost packets) are weighted higher than others (e.g. jitter). The overall score may then be used to determine which device has the most favorable network parameters.

In block 445, transcription of the selected audio stream may be requested. As explained above, the transcription service may be an external service that charges a fee per transcription. By limiting the number of transcription requests for the same audio stream, the overall transcription costs can be reduced. Even in a case where transcription is not fee based, the consumption of additional processing power to perform redundant tasks can be avoided.

In block 450, it may be determined if the transcription process is complete. If not, the process may optionally move to block 455. In block 455, the network parameters may periodically be requested for the first and second device. The purpose of this is to determine if the device with the most favorable network parameters that was initially selected still has the most favorable parameters. The process moves to block 425, where the selection process is repeated. If a different device now has the most favorable network parameters, that audio stream from that device can be selected.

If it is determined in block 450 that the transcription process is complete (e.g. call is over), the process moves to block 460. In block 460, the transcription of the selected audio stream is sent to both the first and second device.

Figure 5:
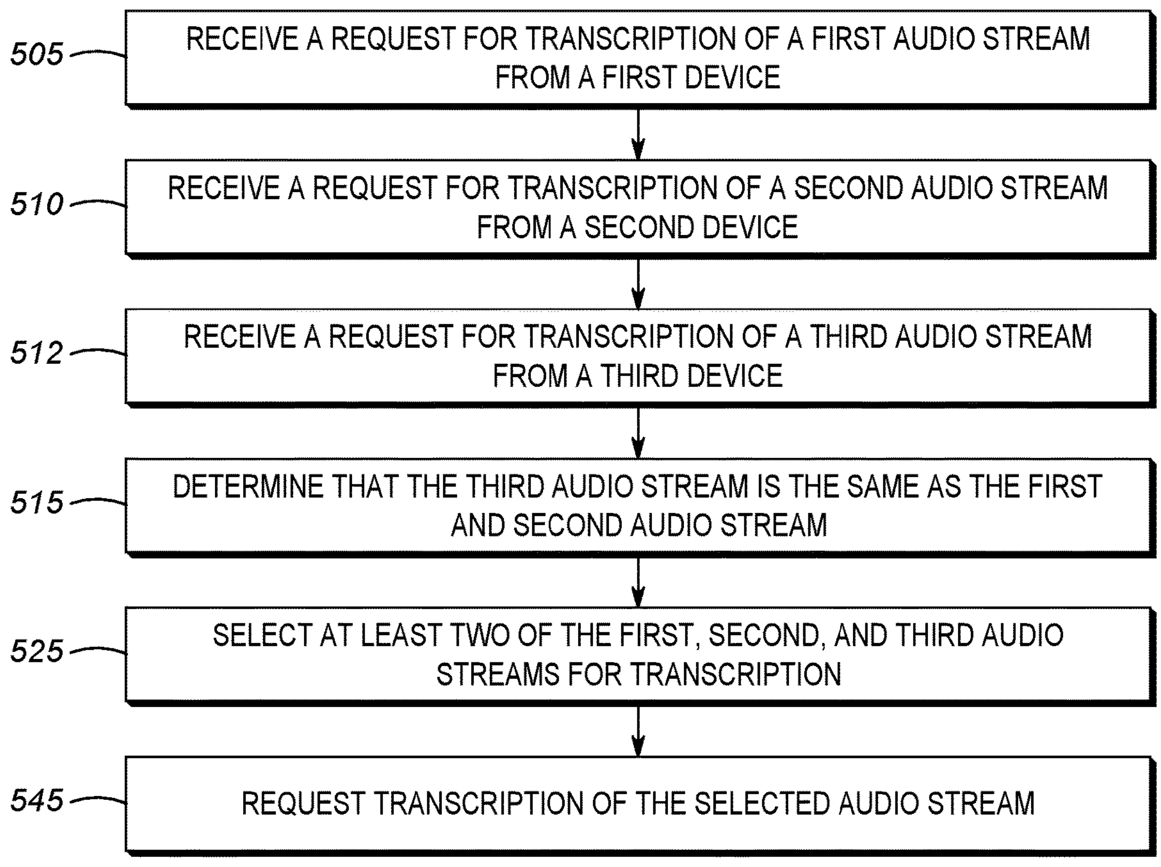
FIG. 5 is another example flow diagram in accordance with the smart transcription proxy service for limiting audio processing techniques described herein.

FIG. 5 is another example flow diagram 500 in accordance with the smart transcription proxy service for limiting audio processing techniques described herein. Flow diagram 500 is very similar to flow diagram 400. In block 505, just as with block 405, a request for transcription of a first audio stream may be received from a first device. In block 510, just as in block 410, a request for transcription of a second audio stream may be received from a second device.

In block 512, a request for transcription of a third audio stream may be received from a third device. The third device may be a server, such as server 110-3 described with respect to FIG. 1.

In block 515, it may be determined that the third audio stream is the same as the first and second audio stream. In other words, all three audio streams from all three devices are the same. The techniques described with respect to FIG. 4 for determining that the audio streams are the same (e.g.

from the call metadata) can be used to determine if the first, second, and third audio streams are the same.

In block 525, at least two of the first, second, and third audio stream may be selected from transcription. By selecting multiple audio streams it is possible that if the quality between the streams is variable, the requested transcripts, when combined, may provide for improved transcript quality. By selecting less than the full number of available audio streams, the cost and/or waste of processing power for transcribing multiple duplicate streams can be reduced, although not eliminated. In block 545, transcription of the selected audio stream may be requested.

Figure 6:
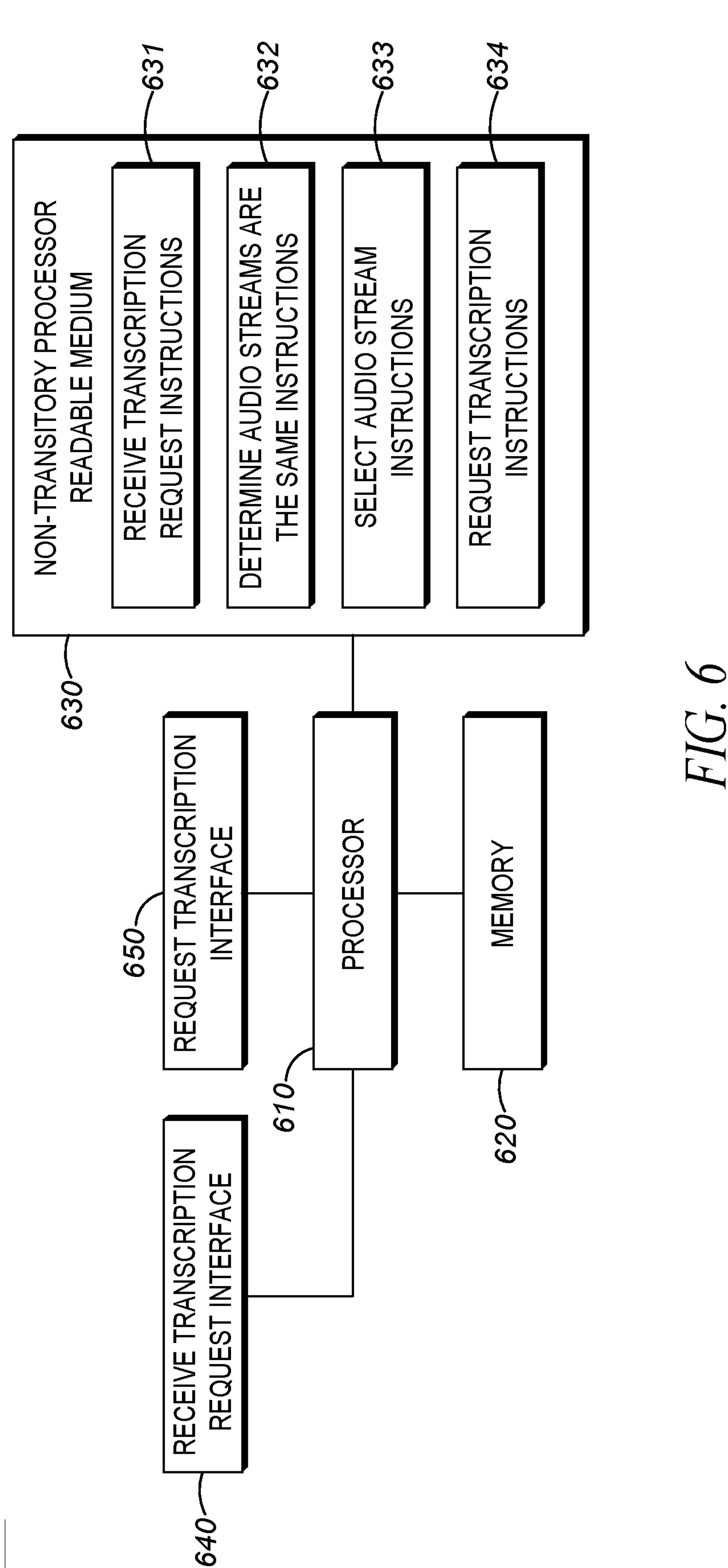
FIG. 6 is an example of a device that may implement the smart transcription proxy service for limiting audio processing techniques described herein.

FIG. 6 is an example of a device that may implement the smart transcription proxy service for limiting audio processing techniques described herein. It should be understood that FIG. 6 represents one example implementation of a computing device that utilizes the techniques described herein. Although only a single processor is shown, it would be readily understood that a person of skill in the art would recognize that distributed implementations are also possible. For example, the various pieces of functionality described above (e.g. transcription requests, audio stream selection, etc.) could be implemented on multiple devices that are communicatively coupled. FIG. 6 is not intended to imply that all the functionality described above must be implemented on a single device.

Device 600 may include processor 610, memory 620, non-transitory processor readable medium 630, receive transcription request interface 640, and request transcription interface 650.

Processor 610 may be coupled to memory 620. Memory 620 may store a set of instructions that when executed by processor 610 cause processor 610 to implement the techniques described herein. Processor 610 may cause memory 620 to load a set of processor executable instructions from non-transitory processor readable medium 630. Non-transitory processor readable medium 630 may contain a set of instructions thereon that when executed by processor 610 cause the processor to implement the various techniques described herein.

For example, medium 630 may include receive transcription request instructions 631. The receive transcription request instructions 631 may cause the processor to receive requests for transcription of audio streams via the receive transcription request interface 640. For example, the transcription requests may be received from the site servers, such as site servers 110 described with respect to FIG. 1. The receive transcription request instructions 631 are described throughout this description generally, including places such as the description of blocks 405, 410, and 505-512, as well as the message sequence diagrams shown in FIGS. 2 and 3.

The medium 630 may include determine audio streams are the same instructions 632. The determine audio streams are the same instructions 632 may cause the processor to determine that the requested audio streams are the same by comparing call metadata of each of the audio streams. If the metadata is the same, the streams are the same. The determine audio streams are the same instructions 632 are described throughout this description generally, including places such as the description of blocks 415, 420, and 515.

The medium 630 may include select audio stream instructions 633. The select audio stream instructions 633 may cause the processor to select one or more audio streams to be transcribed by a transcription service. The selecting the audio stream instructions may cause the processor to select the audio stream with the most favorable network parameters. The select audio stream instructions 633 are described throughout this description generally, including places such as the description of blocks 425-440, 450, 455, and 525.

The medium 630 may include request transcription instructions 634. The request transcription instructions 634 may cause the processor to utilize the request transcription interface 650 to request that the selected audio streams be transcribed by the transcript service. For example, the request transcription interface may allow the processor to request transcription for a transcription service such as that described with respect to FIGS. 4 and 5. The request transcription instructions 634 are described throughout this description generally, including places such as the description of blocks 460 and 545, as well as the message sequence diagrams shown in FIGS. 2 and 3.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot directly and electronically communicate with servers, transcription services, including cloud based transcription services, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for transcription of an audio stream comprising:
receiving a request for transcription of a first audio stream from a first device;
receiving a request for transcription of a second audio stream from a second device;
determining that the first and second audio streams are the same by determining at least one of a call ID, a source ID, and a timestamp of the first and second audio streams are the same for each audio stream;
selecting only one of the first and second audio streams for transcription; and
requesting transcription of the selected audio stream, wherein a transcription fee is charged for only the selected audio stream.

2. The method of claim 1 further comprising:
sending the transcription of the selected audio stream to both the first and second device.

3. The method of claim 1 wherein selecting one of the first and second audio streams further comprises:
requesting network parameters from the first and second device; and
selecting the audio stream from the device with the most favorable network parameters.

4. The method of claim 3 wherein the network parameters include at least one of jitter, packet loss, and latency.

5. The method of claim 3 further comprising:
periodically requesting network parameters from the first and second device; and
repeating the step of selecting the audio stream from the device with the most favorable network parameters.

6. The method of claim 1 further comprising:
receiving a request for transcription of a third audio stream from a third device;
determining that the third audio stream is the same as the first and second audio stream; and
selecting at least two of the first, second, and third audio streams for transcription.

7. A system comprising:
a processor; and
a memory coupled to the processor, the memory containing a set of instructions thereon that when executed by the processor cause the processor to:
receive a request for transcription of a first audio stream from a first device;
receive a request for transcription of a second audio stream from a second device;
determine that the first and second audio streams are the same by determining that at least one of a call ID, a source ID, and a timestamp of the first and second audio streams are the same for each audio stream;
select only one of the first and second audio streams for transcription; and
request transcription of the selected audio stream, wherein a transcription fee is charged for only the selected audio stream.

8. The system of claim 7 further comprising instructions to:
send the transcription of the selected audio stream to both the first and second device.

9. The system of claim 7 wherein the instructions to select one of the first and second audio streams further comprises instructions to:
request network parameters from the first and second device; and
select the audio stream from the device with the most favorable network parameters.

10. The system of claim 9 wherein the network parameters include at least one of jitter, packet loss, and latency.

11. The system of claim 9 further comprising instructions to:
periodically request network parameters from the first and second device; and
repeat execution of the instructions to select the audio stream from the device with the most favorable network parameters.

12. The system of claim 7 further comprising instructions to:
receive a request for transcription of a third audio stream from a third device;
determine that the third audio stream is the same as the first and second audio stream; and
select at least two of the first, second, and third audio streams for transcription.

13. A non-transitory processor readable medium containing a set of instructions thereon that when executed by a processor cause the processor to:
receive a request for transcription of a first audio stream from a first device;
receive a request for transcription of a second audio stream from a second device;
determine that the first and second audio streams are the same by determining that at least one of a call ID, a source ID, and a timestamp of the first and second audio streams are the same for each audio stream;
select only one of the first and second audio streams for transcription; and
request transcription of the selected audio stream, wherein a transcription fee is charged for only the selected audio stream.

14. The medium of claim 13 further comprising instructions to:
send the transcription of the selected audio stream to both the first and second device.

15. The medium of claim 13 wherein the instructions to select one of the first and second audio streams further comprises instructions to:
request network parameters from the first and second device; and
select the audio stream from the device with the most favorable network parameters.

16. The medium of claim 15 further comprising instructions to:
periodically request network parameters from the first and second device; and
repeat execution of the instructions to select the audio stream from the device with the most favorable network parameters.

17. The medium of claim 13 further comprising instructions to:
receive a request for transcription of a third audio stream from a third device;
determine that the third audio stream is the same as the first and second audio stream; and select at least two of the first, second, and third audio streams for transcription.

* * * * *